United States Patent [19]

Rankin

[11] Patent Number: 4,909,740
[45] Date of Patent: Mar. 20, 1990

[54] G. P. A. CHALLENGE GAME, AND METHODS OF CONSTRUCTING AND UTILIZING SAME

[76] Inventor: Jerry L. Rankin, 22881 Newport, Southfield, Mich. 48076

[21] Appl. No.: 193,561

[22] Filed: May 13, 1988

[51] Int. Cl.⁴ .............................................. G09B 19/00
[52] U.S. Cl. ...................................... 434/238; 283/1; 283/115; 434/109; 434/430
[58] Field of Search .............. 434/236, 238, 108, 109, 434/365, 430, 433, 428, 429, 353, 363; 283/1 A, 1 R, 66 R, 66 A, 45, 46

[56] References Cited

U.S. PATENT DOCUMENTS

| | | | |
|---|---|---|---|
| 1,300,871 | 4/1919 | Prager | 283/1 A |
| 1,405,169 | 1/1922 | Smythe, Jr. | 283/49 |
| 1,419,809 | 6/1922 | Bowles, Jr. | 283/66 R |
| 3,782,009 | 1/1974 | Darnell | 434/238 |
| 4,065,131 | 12/1977 | Martin, Jr. et al. | 273/243 |
| 4,384,855 | 5/1983 | Walsh | 434/238 |
| 4,639,226 | 1/1987 | Rahn et al. | 434/433 |

*Primary Examiner*—William H. Grieb
*Attorney, Agent, or Firm*—Irving M. Weiner; Joseph P. Carrier; Robert M. Petrik

[57] ABSTRACT

A G.P.A. challenge game encouraging a student to raise his/her overall grade point average and a method for playing the game. The game comprises a course document sheet, a graphic progress chart, a weekly/monthly planner sheet, and privilege and bonus privilege coupon cards. The student is responsible for recording the grades he/she receives, graphing his/her weekly grade point averages, and planning for and prioritizing scheduled tests, reports, etc. The student is rewarded for higher G.P.A. achievement by means of privilege and bonus privilege coupon cards redeemable for a variety of privileges granted to the student.

15 Claims, 1 Drawing Sheet

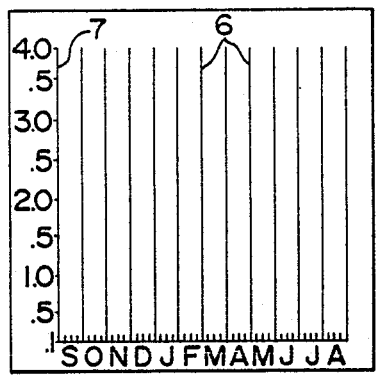

G. P. A. CHALLENGE GAME, AND METHODS OF CONSTRUCTING AND UTILIZING SAME

BACKGROUND OF THE INVENTION

1. Field of the Invention

The present invention relates to means for displaying student grade point averages and means of motivating higher student G.P.A. achievement in the form of a challenge game, and methods of constructing and utilizing that game. Student academic achievement in this challenge game is to be measured by grade point averages. Grade point average is often abbreviated to the form G.P.A. This abbreviation will be used in places throughout the specification and claims. More particularly, the present invention relates to a G.P.A. challenge game which utilizes means of displaying and prioritizing student work and accomplishment and providing reinforcement for higher G.P.A. achievement.

2. Description of Relevant Art

The relevant art is exemplified by Rahn et al. U.S. Pat. No. 4,639,226 entitled "ADULT/CHILD COMMUNICATION KIT"; Martin, Jr. et al. U.S. Pat. No, 4,065,131, entitled "BOARD GAME APPARATUS"; and W. W. Smythe, Jr. U.S. Pat. No. 1,405,169 entitled "GRAPHIC CHART".

The Rahn et al. patent discloses a communication kit for organizing and encouraging postal communication between an adult (such as a divorced parent) and a child. The kit includes a plurality of sets of stationery, each set tailored to a specific month of the year, while each set includes a calendar for the month, two letters, two small returnable postcards, two envelopes, one special project, and two large postcards.

The Martin Jr., et al. patent discloses a board game based on skill and chance in which the various spaces on the board pertain to typical experiences encountered while attending college.

The W. W. Smythe, Jr. patent discloses a graphic chart which is specifically adapted for keeping graphic records of golf scores over a period of several months. The chart defines numerous columns, corresponding to months and days of the months, and numerous rows, corresponding to players' scores.

The present invention's overall object, structure, and operation are significantly different from the above listed relevant art. The present invention includes features which are not taught or suggested by the relevant art. These features provide a challenge game specifically related to G.P.A. performance, display thereof, and means for reinforcement of increased G.P.A. achievement.

SUMMARY OF INVENTION

The present invention provides a G.P.A. challenge game designed to stimulate family cooperation and student responsibility in attaining a student's highest possible academic achievement as measured by grade point average. The game comprises a course document sheet, graphic progress chart, weekly/monthly planner sheet, and a plurality of privilege and bonus privilege coupon cards.

The course document sheet may preferably, but not necessarily, take the form of a lined sheet with headings for listing each academic course in which the student is enrolled. Under each listed course heading are numerous spaces for listing the scores received on graded student coursework, i.e., tests, quizzes, reports, etc. The course document sheet thus serves as a written record of the student's academic accomplishment and as a data base for completing the graphic progress chart.

The graphic progress chart may preferably, but not necessarily, be a graph with columns representing months and weeks of the school year on the X axis, and the possible range of grade point averages on the Y axis. As the student enters his/her weekly grade point average the chart provides for a weekly graphic display of the student's G.P.A. progress.

Privilege and bonus privilege coupon cards may preferably be used to reward the student when his/her G.P.A. achievement meets or exceeds projected goals. The reward time may be set at weekly and other selected intervals throughout the challenge game.

The weekly/monthly planner sheet provides spaces to list scheduled graded student coursework and provides a separate column for recording the student's selected weekly G.P.A. priorities. It may preferably, but not necessarily, be arranged in columns of days of the week, and beneath those columns may be rows containing numerous spaces for lasting scheduled graded student coursework throughout a monthly period. The planner sheet thus provides a visual display of upcoming graded student coursework, to serve as a reminder and scheduling tool for the student.

An object of the present invention is to provide means for frequent positive encouragement of the student so that good study habits and achievement of the best possible grades are reinforced in the shortest possible time frame through means of family recognition and structured rewards.

Another object of the present invention is to build a student's confidence in his/her ability to raise his/her overall grade point average and academic achievement.

Yet another object of the present invention is to provide means to build a student's sense of responsibility for his/her own accomplishments.

A further purpose of the present invention is to provide a means of recording, graphically displaying, and prioritizing the student's G.P.A accomplishments and goals.

For the accomplishment of these and related objects which shall become apparent as the description proceeds, the present invention resides in the construction, combination and utilization of parts as shall be hereinafter more fully described, illustrated in the accompanying drawings, and pointed out in the appended claims.

BRIEF DESCRIPTION OF THE DRAWINGS

FIG. 1 illustrates the graphic progress chart employed in the present invention.

FIG. 2 illustrates a course document sheet which is used in the present invention.

FIG. 3 illustrates a weekly/monthly planner sheet which is used in the present invention.

FIG. 4 illustrates a bonus privilege coupon to be used in the present invention.

FIG. 5 represents a privilege coupon to be used in the present invention.

DETAILED DESCRIPTION OF THE PREFERRED EMBODIMENTS

With reference to FIGS. 1-5 there is shown a G.P.A. challenge game for the purpose of raising a student's overall grade point average. While the game contents are shown in FIGS. 1-5, it should be noted that these figures are only illustrative and such a game may be constructed using variations of these charts, cards and sheets which accomplish the same purpose.

With reference now to FIG. 2, there is shown a course document sheet 1 according to the invention. The preferred embodiment has several headings 2 which are intended to correspond to the student's courses and providing space where he/she may list such courses. Under each course heading 2 there are numerous rows 3, divided into boxes 4, for listing the dated scores the student receives on graded student coursework, i.e., tests, quizzes, reports, etc. throughout the course of an academic period. It is intended that this course document sheet 1 be large enough to be easily handled, written on, and read.

The student is to be responsible for entering his/her scores onto the course document sheet 1 to provide a written record of all grades received by him/her. This course document sheet 1 will then provide a written record of the student's academic accomplishment and serve as a data base for completing the graphic progress chart 5, which is illustrated in FIG. 1.

With reference to FIG. 1, the graphic progress chart may preferably, but not necessarily, comprise a relatively large, lined sheet with numerous columns 6 corresponding to the months in a school year which can also be subdivided into weeks of the school year.

The chart 5, on its other axis 7 contains numerous rows corresponding to the range of possible grade point averages the student can achieve. This chart 5 may preferably, but not necessarily, be approximately 17"×22". It is intended that the student be responsible for weekly posting his/her grade point averages in his/her courses on the graphic progress chart 5.

As the student plots the weekly grade point average of his/her courses, a graphic representation of his/her performance is made available. The student and his/her parents can then utilize this graph to select G.P.A. areas which require further work and/or improvement by the student.

With reference to FIG. 3, the weekly/monthly planner sheet 8 may preferably, but not necessarily, comprise a lined sheet with numerous columns 9 corresponding to the days of the week, and to one side of that, a weekly priorities column 10. Each column 9 and 10 has numerous rows 11 for listing scheduled graded student coursework, i.e. tests, reports, quizzes, etc. throughout a monthly period. The weekly/monthly planner sheet 8 is intended to be of a size which is easily written upon, handled, read, and displayed.

On the weekly/monthly planner sheet 8 it is the student's job to record his/her scheduled graded student coursework so that he/she may adequately plan for them. To one side of the daily columns is a weekly priorities column 10. In the weekly priorities column 10 the student is to prioritize the graded student coursework for the upcoming week and record the same, as a reminder of areas needing special concentration.

Shown in FIGS. 4 and 5 are the bonus privilege coupon cards 12 and privilege coupon cards 13 which may preferably, but not necessarily, be substantially the size of ordinary playing cards with one side labelled "privilege coupon" or "bonus privilege coupon", and the other side of the card stating what particular privilege is to be granted upon redemption of the coupon.

Operation and Method of Utilization of the G.P.A. Challenge Game

It is intended that the student will have responsibility for recording his/her courses and his/her course grades received therein on the course document sheet 1 (FIG. 2). At the end of each week the student will calculate his/her grade point average for all courses and record these grade point averages on the graphic progress chart 5 (FIG. 1) for the week in question. Thus, the course document sheet 1 is a written list of the student's courses or classes and scores received therein, while the graphic progress chart 5 is a graphic representation of this same data as translated into grade point average form.

As the data becomes available to the parents and the student, trends will begin to emerge with regard to the student's G.P.A. performance. Such a graphic representation will highlight the weak points and the strong points of the student's G.P.A. performance and provide a basis for scheduling and prioritizing the student's G.P.A. work areas.

On a recurring basis, preferably, but not necessarily, weekly, it is intended that the student and his/her parents together review student G.P.A. performance. Parents would then reward student performance which meets or exceeds the desired goals and expectations by awarding the student privilege coupon cards or bonus privilege coupon cards, or both, and offer supportive ideas for improvement of less than desired performance.

With the weekly/monthly planner sheet 8 illustrated in FIG. 3, the student will list for the current month all scheduled graded student coursework. Such a scheduling calendar will thereby aid in prioritizing his/her time according to date and category of test. Utilizing the weekly/monthly planner sheet's weekly priority column 10, the student and his/her parents are reminded of what area is of most concern at that time, thereby allowing the student to schedule his/her study time more efficiently in an effort to raise his/her grade point average.

The weekly time frame of the course document sheet 1, the graphic progress chart 5, and the weekly/monthly planner sheet 8 are intended to provide grade point average feedback for the student and parent in the shortest possible time frame. This will also facilitate reinforcement of positive G.P.A. achievement in the shortest possible time frame; both by means of family recognition, and through the giving of privilege coupons 12 and 13 to the student to reward superior G.P.A. performance.

When adequate data becomes available to chart trends and recognize categories of course work needing more improvement, or categories that are adequate at the current performance level, the student will be encouraged to predict an increased level of G.P.A. performance before taking the test listed on the weekly/monthly planner sheet 8. When the student achieves a desired and/or predetermined level of course work, he or she will be entitled to bonus privilege coupons 12 for raising the overall level of his or her grade point average.

In the preferred embodiment the privilege coupons 13 and bonus privilege coupons 12 may comprise a set of cards including at least four of each of the following kinds of privileges: a 25 percent allowance bonus, a ½ hour curfew bonus, a one hour curfew bonus, a 50 percent allowance bonus, one domestic duty delegated, miscellaneous bonus, one pizza bonus, luncheon bonus, restaurant bonus, fast food bonus, telephone curfew bonus, television curfew bonus, one party bonus, 50 percent off small item, 50 percent off large item, bonus movie pass, 50 percent room service, deluxe room service, 25 percent off anything, 50 percent off anything, 100 percent off anything, breakfast in bed, family car bonus, student entertainment pass, and one hour dating bonus. These privilege coupons can be redeemed at the student's pleasure or through negotiation with his/her parents.

As the student's confidence in his/her ability to positively influence his/her grade point average increases, the use of privilege or bonus privilege coupons, or both, may be regarded as optional or phased out entirely in lieu of other rewards or the simple reward of G.P.A. accomplishment.

The constant display, feedback, and reinforcement of the student's G.P.A. level will provide the student with an increased sense of responsibility and power over his/her grade point average and the ability to raise it.

While the present invention has been illustrated and described in connection with preferred embodiments, it is not to be limited to the particular structure shown, because many variations thereof will be evident to one skilled in the art and such variations are intended to be encompassed in the present invention as set forth in the following claims.

I claim:

1. A G.P.A. challenge game for motivating a student, comprising:
   (a) a course document sheet for recording grades received in each course in which a student is enrolled;
   (b) a graphic progress chart for plotting and graphically displaying weekly grade point averages of said student;
   (c) a weekly/monthly planner sheet for recording and displaying scheduled graded student coursework to aid in prioritizing G.P.A. efforts of said student and for recording such priorities;
   (d) a plurality of privilege coupons to be used in rewarding said student for good G.P.A. achievement; and
   (e) a plurality of bonus privilege coupons to be used in rewarding said student for increased G.P.A. achievement,
   whereby said student and the parents of said student may display the G.P.A. achievement of said student by means of said course document sheet and said graphic progress chart; may reward good or increased G.P.A. achievement with said privilege coupons and said bonus privilege coupons; and may plan and prioritize G.P.A. tasks with said weekly/monthly planner sheet.

2. The game according to claim 1, wherein:
said course document sheet comprises a relatively large, lined sheet defining several headings corresponding to each said course of said student, and under each heading numerous rows for listing the scoring of graded student coursework said student received in a particular course.

3. The game according to claim 1, wherein:
said graphic progress chart comprises a relatively large, lined sheet with numerous columns corresponding to weeks and months in a school year, and numerous rows corresponding to the range of possible grade point averages enabling said student to graph his/her weekly grade point average.

4. The game according to claim 3, wherein:
the overall dimensions of said graphic progress chart are in a ratio of approximately 17 to 22.

5. The game according to claim 1, wherein:
said weekly/monthly planer sheet comprises a relatively large, lined sheet with numerous columns corresponding to the days of the week, and including a weekly priorities column, with numerous rows under each column for listing scheduled graded student coursework throughout a monthly period and listing of priority areas of G.P.A. concentration for each week.

6. The game according to claim 1, wherein:
said privilege coupons and bonus privilege coupons comprise substantially standard size playing cards each listing a privilege which said student is entitled to receive upon redemption of the card.

7. The game according to claim 6, wherein:
the privilege represented by said coupon cards comprise (a) a 25 percent allowance bonus, (b) one-half hour of curfew bonus, (c) one hour of curfew bonus, (d) 50 percent allowance bonus, (e) one domestic duty delegated, (f) miscellaneous bonus, (g) one pizza bonus (h) luncheon bonus, (i) restaurant bonus, (j) fast food bonus, (k) telephone curfew bonus, (l) television bonus (m) one party bonus, (n) 50 percent off small item, (o) 50 percent off large item, (p) bonus movie pass, (q) 50 percent room service, (r) deluxe room service (s) 25 percent off anything, (t) 50 percent off anything, (u) 100 percent off anything, (v) breakfast in bed, (w) family car bonus, (x) student entertainment pass, (y) one hour dating bonus; and
with at least four cards of each type of privilege being included in said game.

8. A method for motivating G.P.A. student achievement comprising the steps of:
   (a) listing and displaying of academic courses said student is enrolled in on a course document sheet;
   (b) recording and displaying of grades received in each course in which said student is enrolled on a course document sheet;
   (c) graphically displaying on a weekly basis, a grade point average for each course in which said student is enrolled, on a graphic progress chart;
   (d) recording and displaying all scheduled graded student coursework on a weekly/monthly planner sheet;
   (e) listing priority areas of G.P.A. concentration for an upcoming week on a weekly/monthly planner sheet;
   (f) reviewing G.P.A. achievement of said student on a recurring basis through utilization of the course document sheet, the graphic progress chart, and the weekly/monthly planner guide;
   (g) rewarding good or increased G.P.A. achievement of said student by the reward of privilege coupon cards or bonus privilege coupon card,, or both; and
   (h) offering supportive ideas for increased student G.P.A. performance.

9. A method according to claim 8, wherein:
said student lists each of his/her courses on said course documentation sheet and records each grade received for each said course.

10. A method according to claim 8, wherein:

said student plots his/her weekly grade point average on said graphic progress chart.

11. A method according to claim 8, wherein:

the student and parent review the weekly progress of said student, with the parent acknowledging successful student performance by rewarding the student with said privilege coupons and making supportive suggestions for improvement in areas where present performance is below expectations.

12. A method according to claim 8, wherein:

the student focuses on upcoming scheduled graded student coursework listed on said weekly/monthly planner sheet and lists his/her goals and priorities on said weekly/monthly planner sheet for his/her upcoming weeks' G.P.A. performance.

13. A method according to claim 8, wherein:

as performance trends become known through observation of said graphic progress chart, the student is challenged to predict his/her weekly grades in advance of testing or grading, with heightened G.P.A. achievement being rewarded by giving the student said bonus privilege coupons, with parents suggesting specific strategies and offering the support required for areas in which G.P.A. achievement has fallen below expectations.

14. A method according to claim 8, wherein:

the reward of said privilege coupons and said bonus privilege coupons may become optional as the student's confidence and consistency in influencing his/her grade point average is increased.

15. A method according to claim 8, wherein:

said student lists each of his/her courses on said course documentation sheet and records each grade received for each said course;

said student plots his/her weekly gradepoint average on said graphic progress chart;

the student and parent review the weekly progress of said student, with the parent acknowledging successful student performance by awarding the student with said privilege coupons and making supportive suggestions for improvement in areas here present performance is below expectations; and the student focuses on upcoming scheduled graded student coursework listed on said weekly/monthly planner sheet and lists his/her goals and priorities on said weekly/monthly planner sheet for his/her upcoming week's G.P.A. performance.

* * * * *